United States Patent
Clemens et al.

Patent Number: 5,468,048
Date of Patent: Nov. 21, 1995

[54] SEAT BACK WITH ADJUSTABLE SUPPORT

[75] Inventors: Clive Clemens, Etwall; Robert E. Wain, Burton on Trent, both of United Kingdom

[73] Assignee: Pirelli Tyres Limited, London, England

[21] Appl. No.: 190,122

[22] PCT Filed: Feb. 16, 1993

[86] PCT No.: PCT/GB93/00327

§ 371 Date: Feb. 3, 1994

§ 102(e) Date: Feb. 3, 1994

[87] PCT Pub. No.: WO93/25404

PCT Pub. Date: Dec. 23, 1993

[30] Foreign Application Priority Data

Jun. 9, 1992 [GB] United Kingdom ............... 9212129

[51] Int. Cl.⁶ .................................................. A47C 3/00
[52] U.S. Cl. ............................. 297/284.4; 297/452.52; 297/215
[58] Field of Search ........................ 297/284.4, 215, 297/452.49, 452.52; 248/626

[56] References Cited

U.S. PATENT DOCUMENTS

| | | | |
|---|---|---|---|
| 1,734,776 | 1/1928 | Pallenberg | 248/626 X |
| 4,153,293 | 5/1979 | Sheldon . | |
| 4,283,046 | 8/1981 | Bowles, Jr. | 297/452.52 |
| 4,309,058 | 1/1982 | Barley | 297/284.4 |
| 4,354,709 | 10/1982 | Schuster . | |
| 4,452,485 | 6/1984 | Schuster . | |
| 4,627,661 | 12/1986 | Rönnhult et al. . | |
| 4,798,414 | 1/1989 | Hughes . | |
| 4,909,568 | 3/1990 | Dal Monte . | |
| 4,968,093 | 11/1990 | Dal Monte . | |
| 5,026,116 | 6/1991 | Dal Monte . | |
| 5,335,965 | 8/1994 | Sessni | 297/284.4 |

FOREIGN PATENT DOCUMENTS 2013487  8/1979  United Kingdom .

*Primary Examiner*—Kenneth J. Dorner
*Assistant Examiner*—Anthony D. Barfield
*Attorney, Agent, or Firm*—Watson, Cole, Grindle & Watson

[57] ABSTRACT

A seat back suitable for a vehicle incorporates a mechanically adjustable lumbar support. A flexible panel (9) is mounted by hooks (8) on a rigid frame (6). In the lumbar region pockets (13) formed at the margins of the panel house the central regions (15) of strip spring steel springs (16). The upper and lower ends of each spring curve rearwardly from the panel. The upper ends are interconnected by a cross member (18) and the lower ends are interconnected by a cross member (19). A Bowden cable (22) controlled by a manual or powered actuator is provided for moving the cross members (18, 19) towards each other and thereby causing the central regions (15) of the strip springs to bow outwardly and increase the amount of lumbar support provided by the panel region therebetween.

9 Claims, 2 Drawing Sheets

SEAT BACK WITH ADJUSTABLE SUPPORT

BACKGROUND OF THE INVENTION

1. Field of the Invention

This invention relates to a seat back with an adjustable support and in the preferred embodiment provides a seat back suitable for use in a vehicle seat in which the adjustable support is in the lumbar region.

2. The Prior Art

Within the automotive industry considerable effort has been expended in recent years in the improvement of the comfort of vehicle seats. Particular attention has been paid to providing support for the lower back (usually referred to as the "lumbar region") of the user. With a view to accommodating the requirements of a wide range of potential users of the vehicle seat, it has proved to be desirable to provide for adjustable lumbar support.

Adjustable lumbar supports presently available either involve the use of a selectively inflatable bladder incorporated within the seat back, or involve the use of some mechanical adjustment which is effective to thrust the seat back forward (i.e. towards the user) when firmer lumbar support is required. Although the systems utilizing inflatable bladders have been found to be very satisfactory, they are relatively expensive to provide and their use tends to be limited to relatively expensive vehicles. Existing mechanically adjustable lumbar supports which would be acceptable on a cost basis for less expensive vehicles are, however, less than satisfactory. In particular, in such designs some form of rigid bar or plate spans the width of the back support in the lumbar region. Increasing the degree of lumbar support thrusts this bar or plate forward, and whilst this does increase the pressure applied to the back of the user of the seat, the presence of an essentially rigid bar or plate has been found to be uncomfortable by users of the seat when the system is adjusted to provide a substantial degree of lumbar support.

The present invention provides a mechanically adjustable lumbar support which can be manufactured economically and which does not involve the use of any rigid bar or plate which is thrust forward to increase the degree of lumbar support provided by the seat.

SUMMARY OF THE INVENTION

According to one aspect of the present invention there is provided a seat back including a rigid frame between the opposite sides of which is supported a flexible panel, the marginal regions of the panel adjacent the sides of the frame being provided with pockets in which are located the central regions of respective wire or strip springs, the end regions of each spring extending outwardly from its respective pocket and rearwardly of the seat in a curve; an upper cross member located rearwardly of the panel and interconnecting the upper curved regions of each spring; a lower cross member located rearwardly of the panel and interconnecting the lower curved regions of the springs; and means for forcing the cross members towards each other whereby the central regions of the springs are urged to bow towards the user of the seat and thereby increase the force which the panel located between the central regions of the springs applies to the back of the user.

In use of the invention, reducing the spacing between the cross members causes the springs to bow in the forward direction of the seat and increase the force which the panel applies (indirectly) to the back of the user. However, no bar or plate is utilized to force the padding material of the seat cover forwardly and accordingly there is no "hard" bar or plate which the user of the seat can feel.

The panel may be of any suitable material, for example of a rubber, or fabric, or of a rubber/fabric composite. In the particularly preferred embodiment of the invention the material is a rubber/fabric composite as described in our patent GB-A-1500725. This material has proved particularly comfortable in use.

In a preferred embodiment of the invention a single panel of material spans the full height of the seat back. The lower portion of the panel is provided with springs, etc., in accordance with the invention, whilst the upper portion of the panel is supported in conventional manner on the frame by suitable hooks. In this manner, the required adjustment is provided in the lumbar region, whilst the panel itself provides a smooth transition from the lumbar region to the upper back region where constant support is required.

In a particularly preferred embodiment of the invention the means for varying the spacing between the cross members comprises a Bowden cable, the sheath of which is connected to one cross member and the core of which is connected to the other cross member. Suitable means are provided for drawing the core through the outer sheath in order to reduce the spacing between the cross members. This means can conveniently comprise a manually rotatable adjuster provided on the side of the seat back.

When the force pulling the cross members towards each other is released, the inherent resilience of the springs will automatically return the seat back into a configuration providing a preset minimum degree of lumbar support.

The above and other features and advantages of the Invention will become clear from the following description of a preferred embodiment thereof, given by way of example only, reference being had to the accompanying drawings:

DETAILED DESCRIPTION OF THE PREFERRED EMBODIMENT

Figure 1:
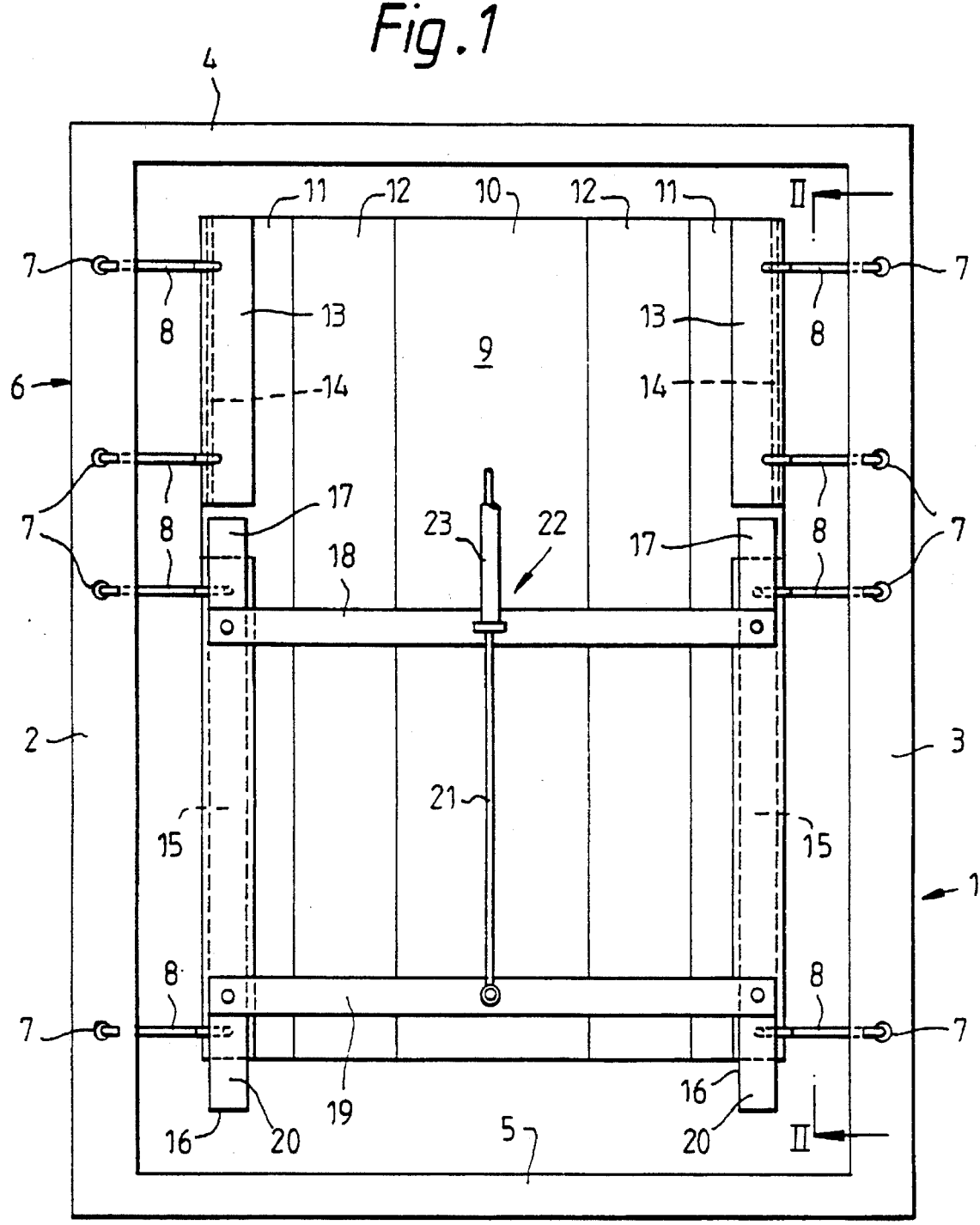
FIG. 1 illustrates schematically from the rear a seat back according to the present invention.

Referring to the drawings, there is shown a seat back 1 suitable for incorporation into the seat of a motor vehicle. It will be appreciated that the seat back 1 will, in use, be associated with a seat platform and the back and platform will be covered with appropriate padding and upholstery material as is conventional within the art.

The seat back 1 comprises pressed steel side members 2,3 interconnected by a top member 4 and a bottom member 5 to provide a rigid frame 6. The exact form of the frame is not critical to the present invention and those skilled in the art will be familiar with the general construction of such frames. For the present purposes, all that need be stated is that the frame 6 is rigid and is furnished with a plurality of apertures 7 for receiving hooks 8. The hooks 8 support within the frame a panel 9 of flexible material. In the illustrated embodiment of the invention the panel 9 is of material substantially as described in our British patent GB-A-1500725 and comprises a central zone 10 of a woven fabric material, marginal zones 11 of a woven fabric material and intermediate zones 12 of rubber secured to the fabric zone in order to allow for resilient deformation of the entire panel.

The fabric material 11 in the marginal zones defines at each margin of the panel a pocket 13. In the upper zone of the seat back the pockets 13 house wires 14 which are engaged by hooks 8. The dimensions of the panel and hooks are chosen such that the upper panel portion is, in the illustrated installed condition, under the correct level of tension to provide the desired support in the upper back region.

Figure 2:
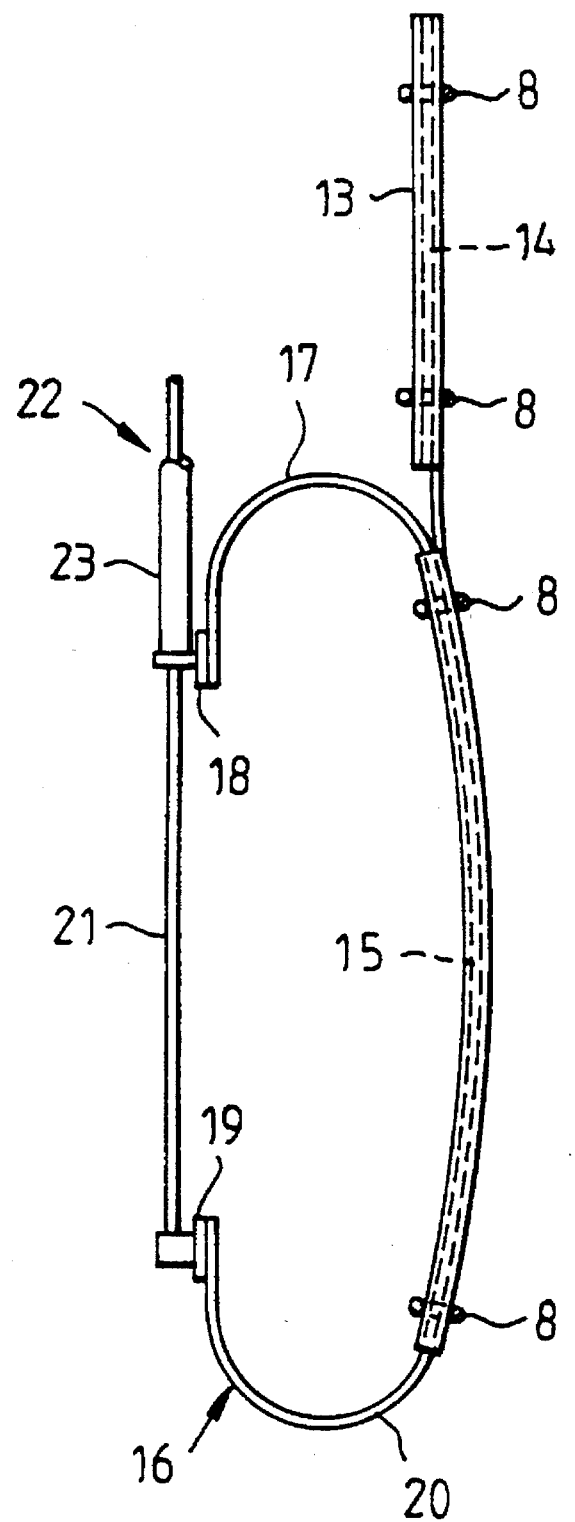
FIG. 2 is a schematic view on the line II—II of FIG. 1.

In the lower region of the panel the pockets 13 house the central region 15 of strip spring steel springs 16. At the upper and lower ends of each central region 15 each spring 16 emerges from its respective pocket 13 and curves rearwardly of the seat back, as most clearly illustrated in FIG. 2. Close to the ends of each central region 15 is a respective hook 8 engages the spring 16 to locate the lower panel portion in the frame 6 and to apply the required cross-tension to the panel. The rearmost end of the upper curved region 17 of each spring is connected to a first cross member 18 which spans the width of the panel. As will be well understood from FIG. 2, the cross member 18 is located substantially to the rear of the panel 9 and will not be "felt" by the user of the seat. A second cross member 19 interconnects the rearmost extremity of each lower curved region 20 of the spring 16. Again, the cross member 19 is located well to the rear of the plane of the panel.

The core 21 of a Bowden cable 22 is secured to the lower cross member 19 and the sheath 23 of the Bowden cable is secured to the upper cross member 18. Means (30) are provided for drawing the core 21 into the sheath 23, thereby reducing the spacing of the cross members 18, 19. This adjusting means may conveniently take the form of a manually rotatable knob connected to a suitable screw-threaded arrangement for drawing the core 21 relative to the sheath 23. This manual adjustment can conveniently be provided on the side of the seat back. In the alternative, appropriate powered adjustment means may be provided.

The springs 16 are so shaped that the inherent resilience to the spring material will tend to straighten the central region 15 of each spring. In the relaxed condition of the springs the central regions 15 may be flat or slightly convex. In the installed condition the maximum possible spacing of the cross members 18,19 is selected (by appropriate choice of means limiting the movement of the Bowden cable 22) to produce the desired "minimum" lumbar support for the seat. This desired minimum condition may be a condition in which the central regions 15 are substantially straight, or may be a condition in which some convex curve to the central regions exists.

If increased lumbar support is required, the adjusting means is appropriately adjusted to draw the cross members 18,19 towards each other. This action will cause the central regions 15 of the springs to bow forward and carry forward with them the panel material therebetween. This will increase the "firmness" of the lumbar region of the seat as required. If, after such adjustment, less lumbar support is subsequently required the adjusting means is simply operated to allow the cross members 18 and 19 to move apart under the inherent resilient effects of the springs.

It will be noted that a single panel 9 is utilized within the preferred embodiment of seat. With this arrangement, there is an automatic and smooth transition from the lumbar region to the upper back region regardless of the state of adjustment of the lumbar region. However, the invention is not limited to this configuration and it may, under some circumstances, be desirable to limit the extent of the lumbar region panel to the lumbar region itself.

Whilst in the preferred embodiment of the invention a single adjustable region is provided in the seat, back it will be appreciated that more than one adjustable region may be provided if desired.

Whilst the invention has been described with particular reference to a panel of material in accordance with our patent GB-A-1500725, it will be appreciated that other materials may be used to form the panel.

We claim:

1. A seat back for use in a seat for adjustably supporting a back of an occupant, said seat back comprising: a rigid frame having opposite sides between which is supported a flexible panel, marginal regions of the panel adjacent the opposite sides of the frame being provided with pockets in which are located central regions of respective wire or strip springs, end regions of each spring extending outwardly from its respective pocket and rearwardly in a curved manner; an upper cross member located rearwardly of the panel and interconnecting upper curved regions of each spring; a lower cross member located rearwardly of the panel and interconnecting lower curved regions of each spring; and means for forcing the upper and lower cross members towards each other whereby the central regions of the springs are urged to bow forwardly and thereby increase the force which the panel located between the central regions of the springs applies to a back of an occupant.

2. A seat back according to claim 1, wherein the panel comprises a composite having at least one area of flexible fabric and at least one area of elastomeric material, the respective areas being secured to each other to permit resilient deformation of the panel.

3. A seat back according to claim 2, wherein the panel comprises a central zone of fabric, marginal zones of fabric, and at least two intermediate zones of elastomeric material, each intermediate zone being secured to a marginal zone and the central zone.

4. A seat back according to claim 2, wherein the fabric is a woven material and is substantially inextensible and the elastomeric material is a rubber material which is secured to the fabric material by vulcanising.

5. A seat back according to claim 1, wherein the panel extends upwardly within the seat back beyond the springs and is secured in an area above the springs to the rigid frame to provide support for an upper back of an occupant, the panel extending substantially a full height of the seat back.

6. A seat back according to claim 1, wherein the means for moving the upper and lower cross members comprises a Bowden cable, a sheath of which is connected to one cross member and a core which is connected to the other cross member, and means secured to the frame for drawing the core through the sheath in order to move the cross members together.

7. A seat back according to claim 6, wherein the means for drawing the core of the Bowden cable through the sheath comprises a manually rotatable adjuster secured to the frame.

8. A seat back according to claim 6, wherein the means for drawing the core of the Bowden cable through the outer sheath comprises power driven means.

9. A vehicle seat containing a seat back for adjustably supporting a back of an occupant, the seat back comprising a rigid frame having opposite sides between which is supported a flexible panel, marginal regions of the panel adjacent the opposite sides of the frame being provided with pockets in which are located central regions of respective wire or strip springs, end regions of each spring extending outwardly from its respective pocket and rearwardly in a curved manner; an upper cross member located rearwardly of the panel and interconnecting upper curved regions of each spring; a lower cross member located rearwardly of the panel and interconnecting lower curved regions of each spring; and means for forcing the upper and lower cross members towards each other whereby the central regions of the springs are urged to bow forwardly and thereby increase the force which the panel located between the central regions of the springs applies to a back of an occupant.

* * * * *